United States Patent
Tsai

(10) Patent No.: US 7,788,842 B2
(45) Date of Patent: Sep. 7, 2010

(54) STRUCTURE OF ARTIFICIAL BAIT

(76) Inventor: Tsung-Hsi Tsai, No. 134, JIanping St., Changhua City, Changhua County 500 (TW)

( * ) Notice: Subject to any disclaimer, the term of this patent is extended or adjusted under 35 U.S.C. 154(b) by 718 days.

(21) Appl. No.: 11/228,233

(22) Filed: Sep. 19, 2005

(65) Prior Publication Data

US 2007/0062097 A1    Mar. 22, 2007

(51) Int. Cl.
*A01K 85/00* (2006.01)
(52) U.S. Cl. .................... 43/42.15; 43/42.24; 43/42.35; 43/17.6
(58) Field of Classification Search ............... 43/42.15, 43/42.24, 17.6, 42.48, 42.35; D22/127
See application file for complete search history.

(56) References Cited

U.S. PATENT DOCUMENTS

| | | | | |
|---|---|---|---|---|
| 2,261,549 A | * | 11/1941 | Hayes | 43/42.06 |
| 2,316,048 A | * | 4/1943 | Clarke | 43/44.2 |
| 2,481,789 A | * | 9/1949 | Smith | 43/42.15 |
| 2,865,130 A | * | 12/1958 | Accetta | 43/42.15 |
| 2,933,846 A | * | 4/1960 | Garner | 43/42.35 |
| 3,344,550 A | * | 10/1967 | Peters | 43/42.11 |
| 3,965,606 A | * | 6/1976 | Bingler | 43/42.16 |

* cited by examiner

*Primary Examiner*—Christopher P Ellis
(74) *Attorney, Agent, or Firm*—Jackson IPG PLLC; Demian K. Jackson

(57) ABSTRACT

An improved artificial bait, which is composed of metal chain, fish-shaped head and body of fish; wherein metal chain is connected in series with chain link pivoted based on end hole and axial pivot; fish-shaped head is composed of two half sectioned body, concave and protruding point for embedding are respectively set on its combining surface, groove of stopping edge is also formed at end part connecting body of fish; body of fish is formed by several blocks made in separated part, concave and protruding point for embedding are made on combining surface of block, slot connecting groove at two ends are also set, stopping edge is then made at end side of groove; based on this structure combination, metal chain can caulk with slot and groove by use of the difference formed between single link and double links, so that block can be put together with each chain part, and stopping edge may make spacing between chain part of metal chain, therefore, the rotation of axial pivot of metal chain can control the connected fish-shaped head and body of fish to sway, which may promote flexibility and strength of artificial bait.

5 Claims, 4 Drawing Sheets

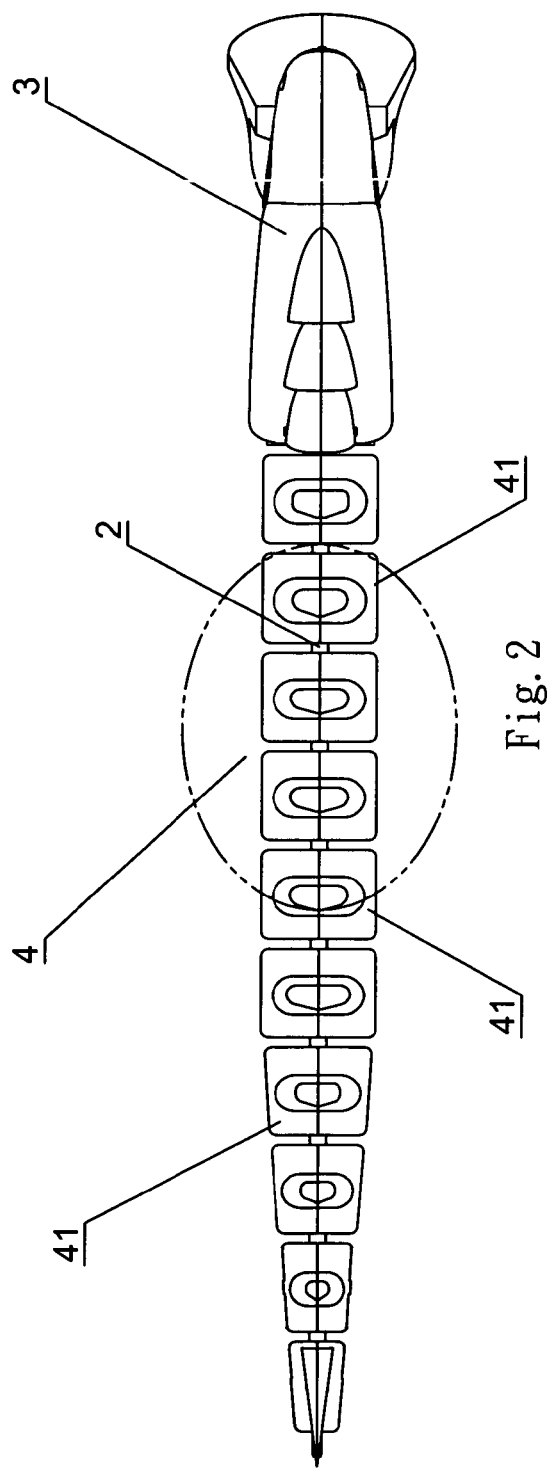
Fig. 2
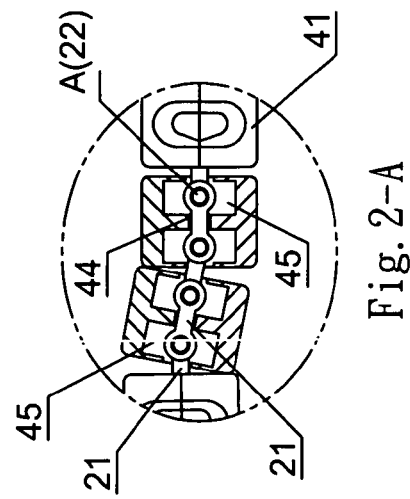
Fig. 2-A

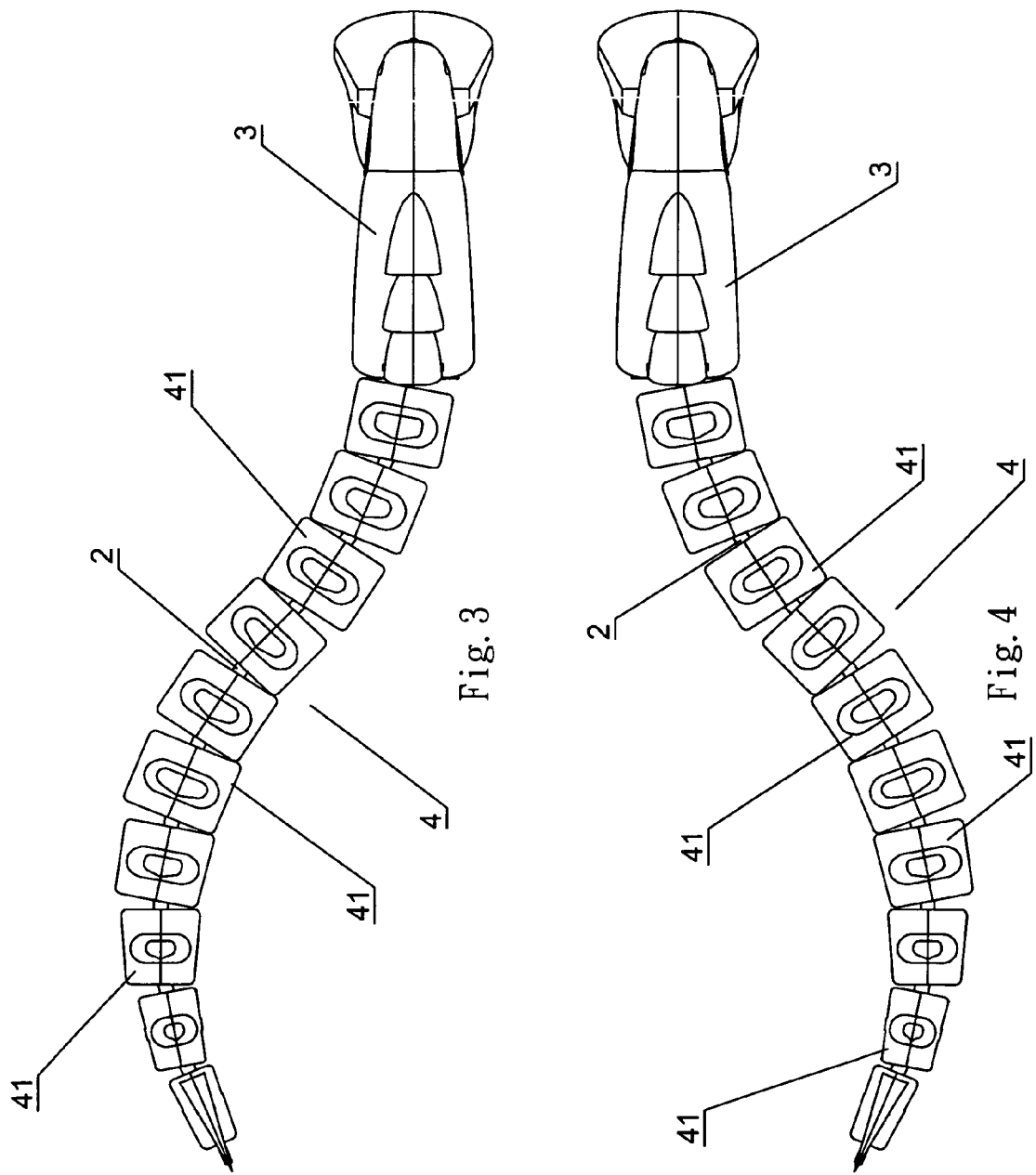

STRUCTURE OF ARTIFICIAL BAIT

BACKGROUND OF THE INVENTION

1) Field of the Invention

This invention relates to an improved structure of artificial bait, which is applicable for bait of fishing tackle in the leisure fishing activity. The artificial bait with verisimilar structure and the chain axis joint to generate spinning may be connected into an artificial fish with head and flexible body, which may induce big fish to eat bait and also bear the weight to pull the big fish during the fishing.

2) Description of the Prior Art

Usually, "fishing" is a leisure sports suitable for everyone, it doesn't matter either it is brook fishing, lake fishing or sea fishing and boat fishing - - - , people can enjoy different landscapes in different fishing places so as to get relaxing and obtain happiness from the pulling of different types of fish. Different water areas have their own type of fish, but the food chain cannot be broken that big fish eats the small one, so, artificial bait in small fish shape is produced in order to induce the big fish to eat bait. According to the current invention, the artificial bait is designed in fish shape, veins and colors are drawn on body of bait, fish hook is also fixed respectively at front and rear of this bait for positioning fishing line so as to induce big fish. However, this type of artificial bait is to induce fish by its colorful veins on body, its another parts are not flexible and verisimilar, therefore, fish may have not eager interest to this type of artificial bait (it is the common opinion of most fishermen), so, its inducing effect is not as good as required, fishermen should waste lots of time and energy but not get expected return (cannot get enough fish as expected) and may lose interests in fishing accordingly.

SUMMARY OF THE INVENTION

1. Problems to Solve (A) Force borne by body of fish is limited: since the current artificial bait is connected and supported by thin steel wire, so, its support strength is limited. It is often broken when pull big fish with force, fish to eat bait may run away once again and let fishermen be regrettable.

(B) Its appearance is not good as expected: its fish-shaped structure is too simple which are quite different from body of real fish, furthermore, it has not any helpful special design, therefore, it may have no attraction to fish since its appearance is not vivid as required.

(C) The swimming pose of artificial bait is not flexible: it is because steel wire may become stiffened when curve, and also cannot quickly and smoothly return back to its original shape, which may disorder sway of artificial bait, wherefore, it cannot produce a natural and flexible swimming effect, so its function to attract big fish to eat bait is limited.

2. Solutions (1) To prepare artificial bait in real fish shape so that it has flexible swimming pose.

(2) To apply metal chain pivoting with chain link as support basis to connect head and body of fish, the free rotation of pivot of each chain link can control sway of each block of bait, so that it can let artificial bait swim naturally and flexibly.

(3) The build-in metal chain of bait can bear heavy weight, so it is enough to stand the pull force when big fish eats the bait, can effectively prevent bait from breaking, especially, it can promote stability of fishing.

BRIEF DESCRIPTION OF THE DRAWINGS

FIG. 2 is the sketch map of structure combination of this invention

FIG. 2-A is the section view of structure combination of this invention

FIG. 3 is the sketch map of bait swaying to left of this invention

FIG. 4 is the sketch map of bait swaying to right of this invention

DETAILED DESCRIPTION OF THE INVENTION

Figure 1:
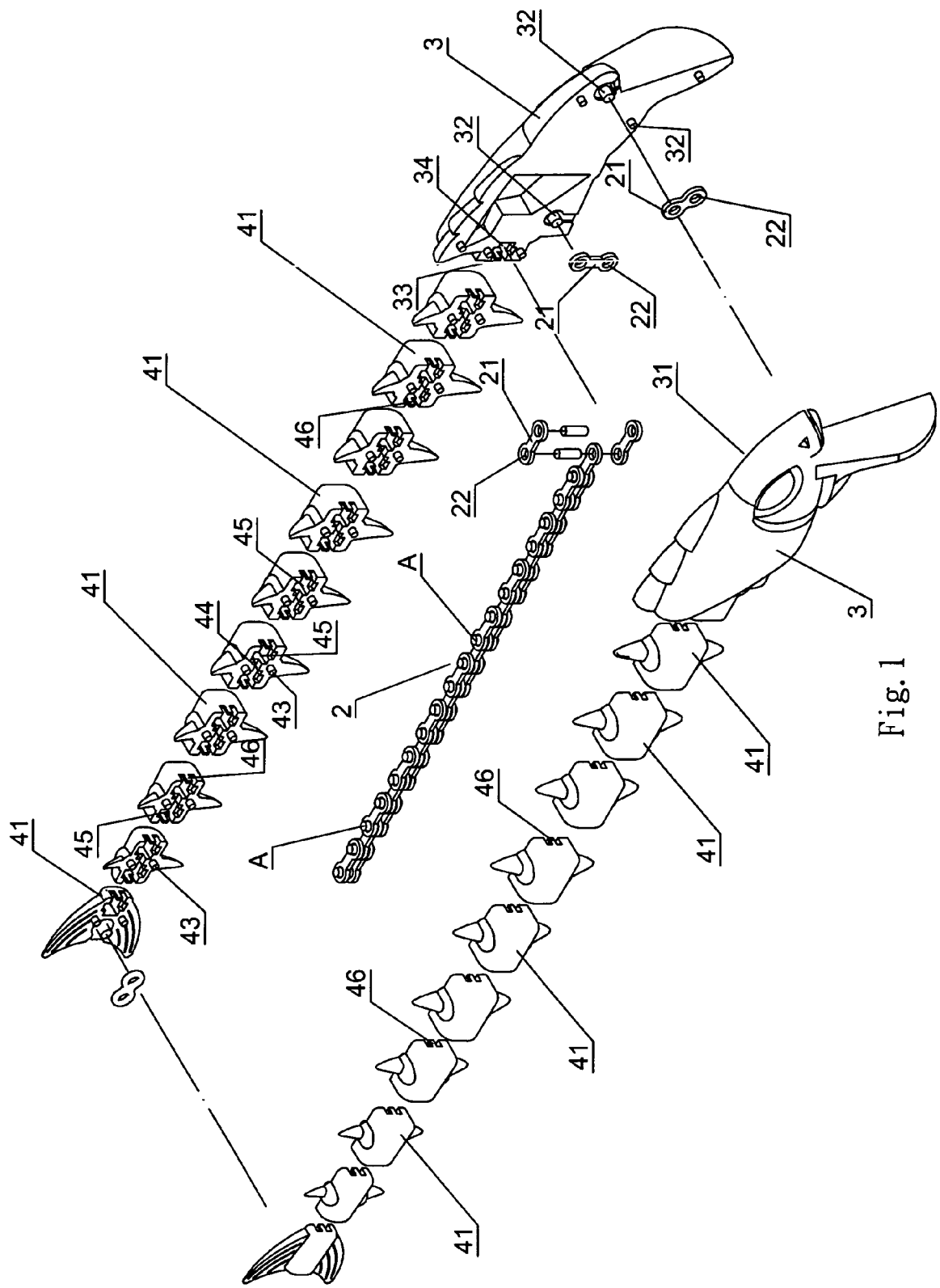
FIG. 1 is the exploded view of structure of this invention

First of all, please refer to FIG. 1, FIG. 2 and FIG. 2-A, this invention is composed of metal chain 2, fish-shaped head 3 and fish body 4; wherein:

Metal chain 2 is connected in series with chain link 21 pivoted with help of end hole 22 and axial pivot A.

Fish-shaped head 3 is composed of two half sectioned body, concave and protruding point 31 and 32 for embedding are respectively set on its surface to put together, groove 34 of stopping edge 33 is also formed at end part connecting body of fish 4.

Body of fish 4 is formed by several blocks 41 made in separated part, concave and protruding point 42 and 43 for embedding are made on surface of block 41, slot 44 connecting groove 45 at two ends are also set, stopping edge 46 is then made at end side of groove 45;

Based on this structure combination, metal chain 2 can caulk with slot 44 and groove 45 by use of the difference formed between single link and double links, so that block 41 can be connected with each chain part, and stopping edge 46 may make spacing between chain part of metal chain 2 (please refer to FIG. 2-A for detail), an artificial bait to induce big fish is then made according to above structures.

Figure 5:
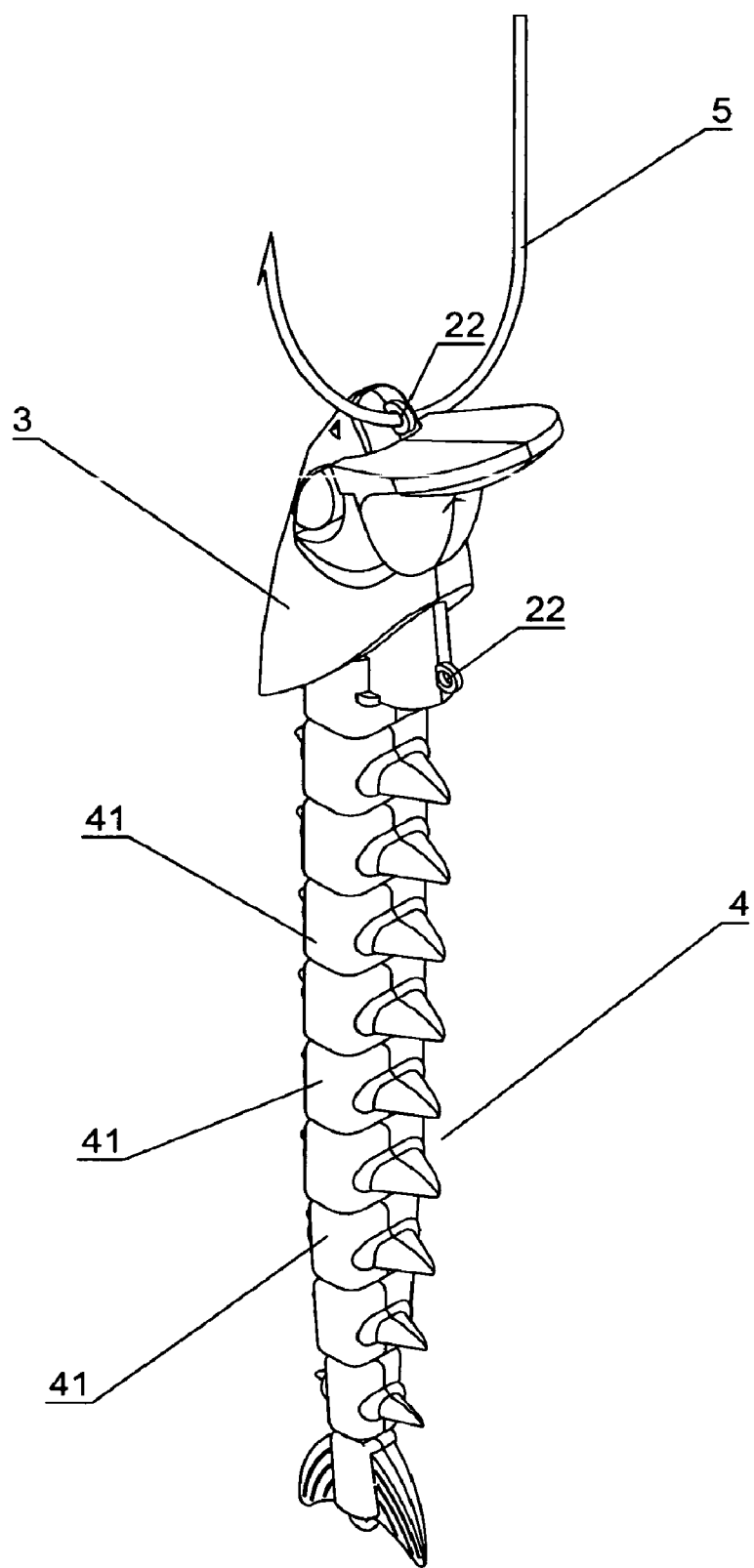
FIG. 5 is the application sketch map of this invention

Secondly, please refer to FIG. 3, FIG. 4 and FIG. 5, this invention is to make use of the rotation between metal chain 2 and axial pivot A, then drive and control synchronously the connected fish-shaped head 3 and body of fish 4 to sway, so that each block 41 can use the independent rotation of each chain part to generate a free sway without any restrain, therefore, it can sway to left and right at will, which may promote its verisimilar effect and strength of structure, it may be easy to induce big fish to eat the bait but not break bait accordingly (please refer to FIG. 3 and FIG. 4);

In addition, the fish-shaped head 3 of this invention is put together by half sectioned body, on which makes concave and protruding point 31 and 32 for putting together, end hole 22 to fix chain link 21, and expose end hole 22 of chain link 21 at top of head and jaws so as to form a hook hole for fishing line hook 5 (please refer to FIG. 5 for the application instruction) when put together the left and right half sectioned body of fish-shaped head 3.

To sum up all above descriptions, this invention can indeed provide artificial bait applicable for fishing in all water areas, furthermore, free sway of each chain part of this metal chain can drive body of fish to sway effectively, also it can bear heavy weight, therefore, the artificial bait of this invention has already accorded with the requirements of a new patent.

What is claimed is:

1. An artificial bait structure comprising:
 a) a metal chain having:

I) a plurality of chain links, each of the plurality of chain links having two end holes; and ii) a plurality of axial pivots inserted through selected end holes of selected chain links of the plurality of chain links pivotally connecting the selected chain links in series by alternatingly connecting a single chain link between two pairs of chain links; and b) a plurality of blocks including include a first end block having a fish-shaped head, a plurality of body blocks, and a second end block, each of the plurality of blocks having:

I) a first body having a plurality of concave points, ii) a second body having a plurality of protruding points, one of the plurality of protruding points is inserted into each of the plurality of concave points;

iii) at least one connecting groove; and iv) at least one stopping edge located on an end thereof adjacent to one of the at least one connecting groove, one end of each pair of chain links is located in each of the at least one connecting groove and has one of the at least one stopping edge inserted there between, wherein the at least one connecting groove of each of the plurality of body blocks including two body connecting grooves, each of the plurality of body blocks including a slot connecting the two body connecting grooves, a first chain end of the metal chain is connected to the first end block, a second chain end of the metal chain is connected to the second end block, and the plurality of body blocks are connected to the metal chain between the first chain end and the second chain end, wherein the plurality of body blocks and the second end block forming a fish body shape.

2. The artificial bait structure according to claim 1, wherein each of the plurality of body blocks decreases in size moving in a direction from the first end block toward the second end block.

3. The artificial bait structure according to claim 1, wherein each of the plurality of blocks includes a material selected from a group consisting of a fluorescent material and a glistening material.

4. The artificial bait structure according to claim 1, wherein each of the plurality of body blocks and the second end block includes at least one fin.

5. The artificial bait structure according to claim 1, further comprising at least one hook chain link connected to the first end block and having a first end hook hole located on a first end thereof and a second end hook hole located on a second end thereof, one of the plurality of protruding points of the first end block is inserted through the first end hook hole, and the second end of the at least one hook chain link protruding outwardly from the first end block.

* * * * *